United States Patent
Muehlhoff et al.

(10) Patent No.: US 6,558,000 B2
(45) Date of Patent: May 6, 2003

(54) PROJECTION DEVICE FOR PROJECTING AN IMAGE ONTO A PROJECTION SURFACE, AND A PROJECTION UNIT FOR COUPLING TO A PROJECTOR

(75) Inventors: Dirk Muehlhoff, Jena (DE); Klaus Knupfer, Essingen (DE); Oliver Baumann, Aalen (DE); Bernd Spruck, Moegglingen (DE)

(73) Assignee: Carl Zeiss Jana GmbH, Jena (DE)

( * ) Notice: Subject to any disclaimer, the term of this patent is extended or adjusted under 35 U.S.C. 154(b) by 0 days.

(21) Appl. No.: 10/149,950
(22) PCT Filed: Aug. 24, 2001
(86) PCT No.: PCT/EP01/09814
§ 371 (c)(1), (2), (4) Date: Jun. 17, 2002
(87) PCT Pub. No.: WO02/17018
PCT Pub. Date: Feb. 28, 2002

(65) Prior Publication Data
US 2002/0180936 A1 Dec. 5, 2002

(30) Foreign Application Priority Data
Aug. 25, 2000 (DE) .......................................... 100 41 722

(51) Int. Cl.⁷ ............................................. G03B 21/14
(52) U.S. Cl. ...................................................... 353/30
(58) Field of Search .............................. 353/29, 30, 94, 353/34, 37, 82, 28

(56) References Cited

U.S. PATENT DOCUMENTS 4,192,584 A   3/1980  Dougherty
5,428,415 A * 6/1995  Keelan et al. ................. 353/71
5,706,063 A   1/1998  Hong
5,772,301 A * 6/1998  Kwon et al. ................. 353/122
5,851,060 A * 12/1998 Uchiyama et al. ............. 353/94

FOREIGN PATENT DOCUMENTS

DE   196 43 567 A1   4/1997
EP   0 560 125 A1    9/1993

* cited by examiner

Primary Examiner—William Dowling
(74) Attorney, Agent, or Firm—Patterson Thuente Skaar & Christensen, P.A.

(57) ABSTRACT

A projection arrangement for projecting an image onto a projection surface, said arrangement comprising a light source (26), a film stage (2), arranged following said light source, for holding a positive image recorded on a carrier medium, and projection optics (3) for projecting a illuminated positive image, is provided with a control unit (25), a light modulator (10) controllable by said control unit in order to generate an additional image on the basis of predetermined image data, said light modulator being followed by an optical device (11) for projecting the additional image onto the projection surface (34), and with a beam splitter (6) arranged between the light source (26) and the film stage (2) so as to split the light from the light source (26) into a first partial beam directed to the film stage (2) in order to illuminate the positive image and into a second partial beam which may be directed to the light modulator (10). Thus, a projection arrangement is provided which allows to project additional images, such as subtitles, in addition to the illuminated positive image.

15 Claims, 4 Drawing Sheets

PROJECTION DEVICE FOR PROJECTING AN IMAGE ONTO A PROJECTION SURFACE, AND A PROJECTION UNIT FOR COUPLING TO A PROJECTOR

The invention relates to a projection arrangement for projecting an image onto a projection surface, said arrangement comprising a light source, a film stage, arranged following the light source, for holding a positive image recorded on a carrier medium, and projection optics for projecting a illuminated positive image. The invention further relates to a projection unit for coupling to a projector.

Such a projection arrangement is, for example, a projector for projecting a motion picture and comprises a light source, a mechanical film stage and projection optics. The light source emits a light ray bundle which illuminates positive images on a film guided transversely to the light propagation direction of the light ray bundle. The illuminated positive images are projected onto a screen by the projection optics. During operation, the film is unwound from a film reel or a film disk on one side of the film stage, guided across said film stage, and wound up on the other side of the film stage on another film reel or another film disk. The film is guided discontinuously across the film stage such that the film is moved past a picture gate on the film stage and stopped, 24 times per second, each individual image being illuminated twice. At the same time, the control signals for the theater sound system are also sampled. Such projector only allows conventional motion pictures to be projected. A simultaneous projection of additional images, which are present only as digital and/or analog data and which, in order to be projected, have to be generated first on the basis of said data, is not possible.

Such simultaneous projection of additional images is advantageous, for example, for the projection of subtitles in a foreign-language movie, because it would then no longer be required to produce individual copies of the motion picture comprising the corresponding subtitles for a certain speech area. Accordingly, the original movie could be used with corresponding subtitle files containing the data for the subtitles in the individual languages. For the projection of such subtitles, which are present only as data, projection devices may be employed which comprise light modulators for imaging, said light modulators allowing to generate the subtitles as additional images according to said data. As light modulators, for example, LCD modules or tilting mirror matrices (DMD chips) are used. If such projection arrangement is provided in addition to the projector for projecting conventional movies, this will result in a high cost of acquisition, since an entire projection arrangement needs to be acquired.

Now, the invention is intended to remedy this and to improve the aforementioned projection arrangement such that the projection arrangement is suitable for simultaneous projection of a positive image recorded on a carrier medium and of an additional image to be generated on the basis of predetermined image data. Moreover, a projection unit for coupling to a projector is to be proposed.

According to the invention, this problem is solved, in the projection arrangement of the above-mentioned type, by a control unit, a light modulator which is controllable by said control unit in order to generate an additional image on the basis of predetermined image data and which is followed by an optical device for projecting the additional image onto the projection surface, and a beam splitter arranged between the light source and the film stage, said beam splitter splitting the light from the light source into a first partial beam directed to the film stage for transilluminating the positive image and into a second partial beam, which may be directed to the light modulator.

In an advantageous embodiment of the projection arrangement according to the invention, the light incident on the beam splitter has a predetermined beam cross-section and the beam splitter is formed such that the degree of splitting between the first and second partial beam varies across the beam cross-section. For example, during the projection of subtitles as additional images, it is thus possible to illuminate the positive image with light of as great a brightness as possible, while a small area of the beam cross-section is used to impinge on the light modulator.

In an advantageous embodiment of the projection arrangement according to the invention, the beam splitter comprises a partially reflective mirror, a beam splitter block, or a deflecting element (e.g. a mirror or a prism) which is arranged partially in a beam cross-section of the light ray bundle emitted by the light source. Thus, reliable splitting of the light ray bundle is achieved.

Preferably, the projection arrangement according to the invention may be further embodied such that the beam splitter is movable into and out of the optical path between the light source and the film stage. There may further be provided a deflecting device which, when the beam splitter is moved out of the optical path between the light source and the film stage, is movable into said optical path in order to direct the light from the light source onto the light modulator. Thus, using this projection arrangement, in addition to the simultaneous projection of the additional image, this projection arrangement may also be operated such that either a illuminated positive image or an image generated by the light modulator is projected.

Preferably, the beam splitter, the light modulator and the optical device are provided as an attachable projection module. This allows the light source of a conventional projector for projecting positive images to be used also as the light source for the light modulator. Further, the conversion of an already existing, conventional projector to the projection arrangement according to the invention is easily possible, because the projection module only needs to be coupled to the conventional projector.

Particularly advantageously, the projection arrangement according to the invention may be further embodied such that a splitting device is provided which splits the light from the light source into different colors, and that the light modulator comprises several light-modulating units, each of which modulates one of said colors. This configuration allows to obtain light outputs which meet the brightness requirements of movie theaters.

In a further advantageous embodiment of the projection arrangement according to the invention, combining optics are provided which combine the light emitted by the light-modulating units to form one single light bundle and guide it to the optical device. This advantageously allows the modulated light of different colors to be imaged on the screen by means of an optical device.

Preferably, the projection arrangement according to the invention is further embodied such that the light modulator comprises an LCD module—which may be in the form of a transmission or reflection module—a GLV module, or a tilting mirror matrix. Thus, a high-quality image may be generated.

In a further advantageous embodiment, the projection optics and the optical device of the projection arrangement according to the invention are comprised in one single projection device. Thus, it is possible to provide a projection arrangement requiring only one projection device, which saves costs.

The projection arrangement according to the invention may advantageously be embodied such that a memory for storing data is provided. Said memory may be a digital memory, e.g. a computer hard disk, or may also be an analog memory, such as a conventional video tape. By providing such memory, the entire data for the additional images may be stored in the projection arrangement, so that there is no need for high transmission capacities of a connection with an external memory.

In another advantageous embodiment of the invention, the projection arrangement according to the invention comprises an interface for receiving data. Said interface may be, for example, a DVD drive. It may also be an interface for a computer network, such as the internet. This allows easy transmission of the data to the projection arrangement.

In a further advantageous embodiment of the invention, a display device and an image recording device are provided, said image recording device being able to record the image projected onto the projection surface and to represent it on the display device. When the image recording device records the film projected onto the projection surface and reproduces it on the display device, it is possible to control the performance from outside the auditorium. Thus, for example, failure of the projection lamp or of the auditorium lighting may be diagnosed at once.

The projection unit according to the invention for coupling to a projector, which projector comprises a light source, a film stage, arranged following said light source, for holding a positive image recorded on a carrier medium, as well as projection optics for projecting a illuminated positive image onto a projection surface, comprises a control unit, a light modulator controllable by said control unit in order to generate an additional image on the basis of predetermined image data, an optical device, arranged following the light modulator, for projecting the additional image onto a projection surface, and a beam splitter which, when the projection module is coupled to the projector, is arranged between the light source and the film stage and splits the light from the light source into a first partial beam directed to the film stage in order to illuminate the positive image and into a second partial beam which may be directed to the light modulator. This projection unit allows easy and fast retrofit of a conventional projector.

A more detailed description of the invention, compared with a movie projector known from the prior art, shall be given below basically by way of example and in view of the drawings, wherein.

Figure 8:
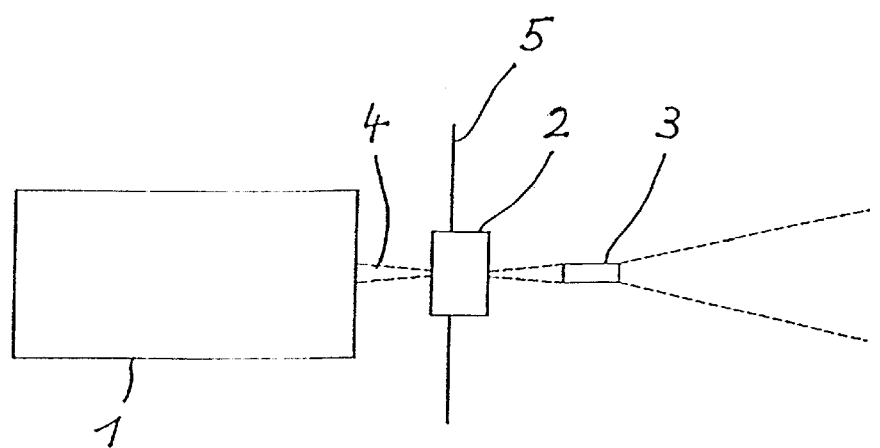
FIG. 8 shows a schematic top view of a conventional movie projector.

For a better understanding of the projection arrangement according to the invention, a brief description shall be given, with reference to FIG. 8, of the basic structure of a conventional projector for projecting positive images or positive films. Such conventional projector contains a lamp housing 1, a mechanical film stage 2 and a projection lens 3. In the lamp housing 1, a light source (not shown) is arranged, which emits a light ray bundle 4 transilluminating a positive image on a film 5 held on the mechanical film stage 2, which film is guided transversely to the light propagation direction of the light ray bundle 4. The illuminated positive image is projected onto a projection surface (not shown) by means of the projection lens 3.

Figure 1:
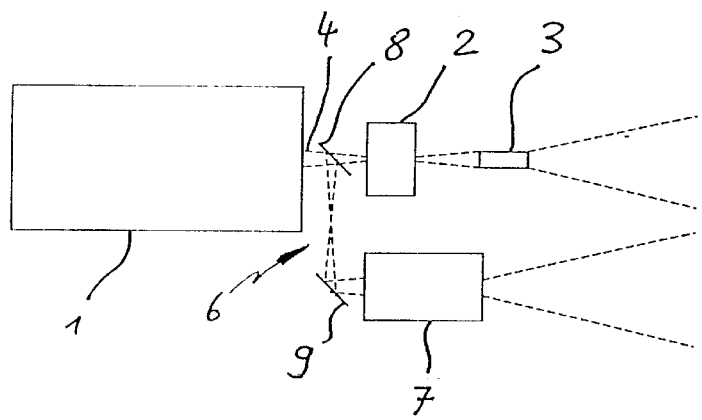
FIG. 1 shows a schematic top view of a projection arrangement according to the invention.

FIG. 1 shows a schematic top view of the projection arrangement according to the invention. Like the conventional projector shown in FIG. 8, the projection arrangement comprises a lamp housing 1, wherein a light source (e.g. a xenon lamp), not shown, is arranged, a mechanical film stage 2 and a projection lens 3. In addition, the projection arrangement according to the invention includes a beam splitter unit 6 and an additional-image generating module 7. The beam splitter unit 6 comprises a first partially reflective mirror 8, which is arranged in the optical path between the lamp housing 1 and the mechanical film stage 2 and which splits the light ray bundle 4 from the light source into a first light ray bundle directed to the film stage 2 and into a second light ray bundle, which is deflected substantially perpendicular to the light propagation direction from the lamp housing 1 to the mechanical film stage 2. The ratio of the light intensities of the first and second light ray bundles may be 1:1. Other ratios are also possible. The second light ray bundle is incident on a second deflecting mirror 9 of the beam splitter unit 6 and is deflected by said second deflecting mirror 9 at approximately 90° such that the light ray bundle deflected by the second deflecting mirror 9 is preferably propagated parallel to the light ray bundle 4 exiting from the lamp housing 1. Said deflected second light ray bundle is incident on the additional-image generating module 7.

Figure 2:
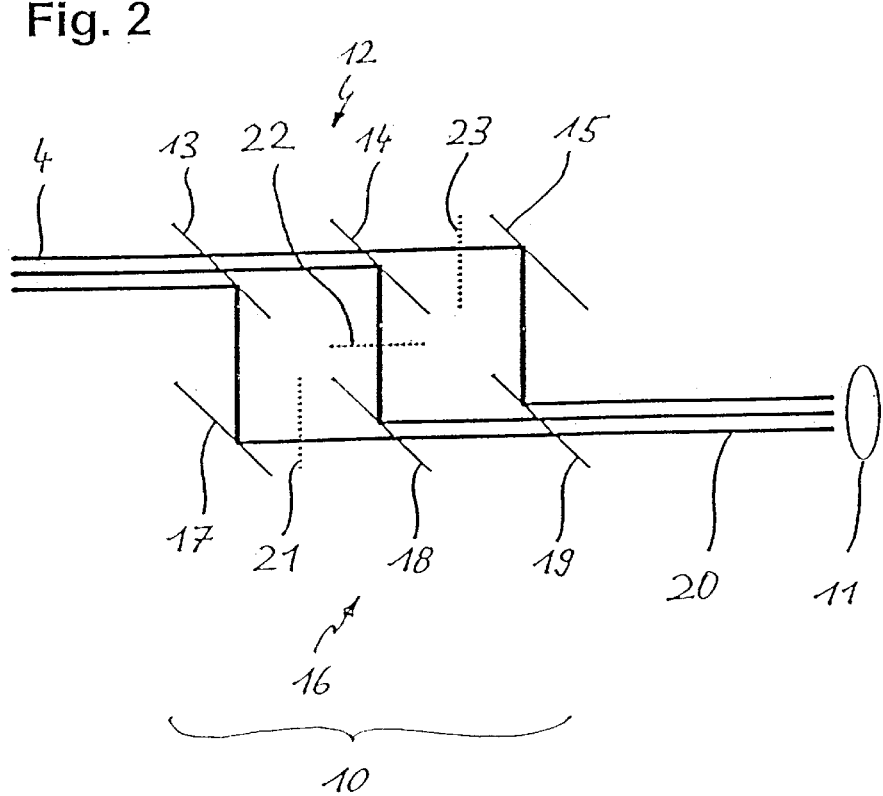
FIG. 2 shows a top view of a light modulator according to an embodiment.

As shown in FIG. 2, the additional-image generating module 7 comprises a light modulator 10 and projection optics 11. The light modulator 10 is controlled on the basis of predetermined image data in such a manner that it generates an image which consists of image pixels, which image is projected by means of the projection optics 11. Further, there may also be provided a light integrator or a light mixing rod (not shown), which precedes the light modulator 10 and transforms the light ray bundle 4 in such a manner that the light-modulating units 21, 22, 23 described below are illuminated as uniformly as possible. The light modulator 10 comprises a color-splitting unit 12 having three mirrors 13, 14 and 15, which are arranged successively along a first optical axis, each of said mirrors being tilted about 45° relative to said first optical axis. The mirror 13 disposed on the inlet side is a mirror which only reflects the blue component of the white light of the light ray bundle. The remaining color components of the light pass through the mirror 13 and are incident on the next mirror 14, which only reflects the green color component thereof. The red light component passing through this mirror 14 is then reflected by the mirror 15, which selectively reflects red light.

The light modulator 10 further includes a color-combining unit 16 comprising three mirrors 17, 18 and 19. Said mirrors 17, 18 and 19 are arranged along a second optical axis, which is parallel to the first optical axis of the light bundle incident on the light modulator 10. Further, these mirrors 17, 18 and 19 are tilted at 45° relative to the second optical axis and arranged such that the blue, green and red light reflected by the mirrors 13, 14 and 15, respectively, is reflected so as to be propagated along the second optical axis. Thus, the blue, green and red light ray bundles are united to form one common light ray bundle 20.

Further, the light modulator 10 comprises three light-modulating units 21, 22 and 23 (e.g. LCD modules), each modulating one color component of the light split into blue, green and red color components, thus creating the required individual color pixels whose combination yields the desired image. In the embodiment shown in FIG. 2, the light modulation unit 21 for the blue light component is arranged between the mirrors 17 and 18. The light modulation unit 22 for the green light component is arranged between the mirrors 14 and 18, and the light modulation unit 23 for the red light component is arranged between the mirrors 14 and 15. The modulation using the light-modulating units 21, 22 and 23 is carried out according to the digital and/or analog data present. The light ray bundle 20, which is color-modulated, is then projected onto the screen (not shown) by means of the projection optics 11. The mirrors 13, 14, 15 and 21, 22, 23 may be in the form of dichroitic mirrors.

Figure 3:
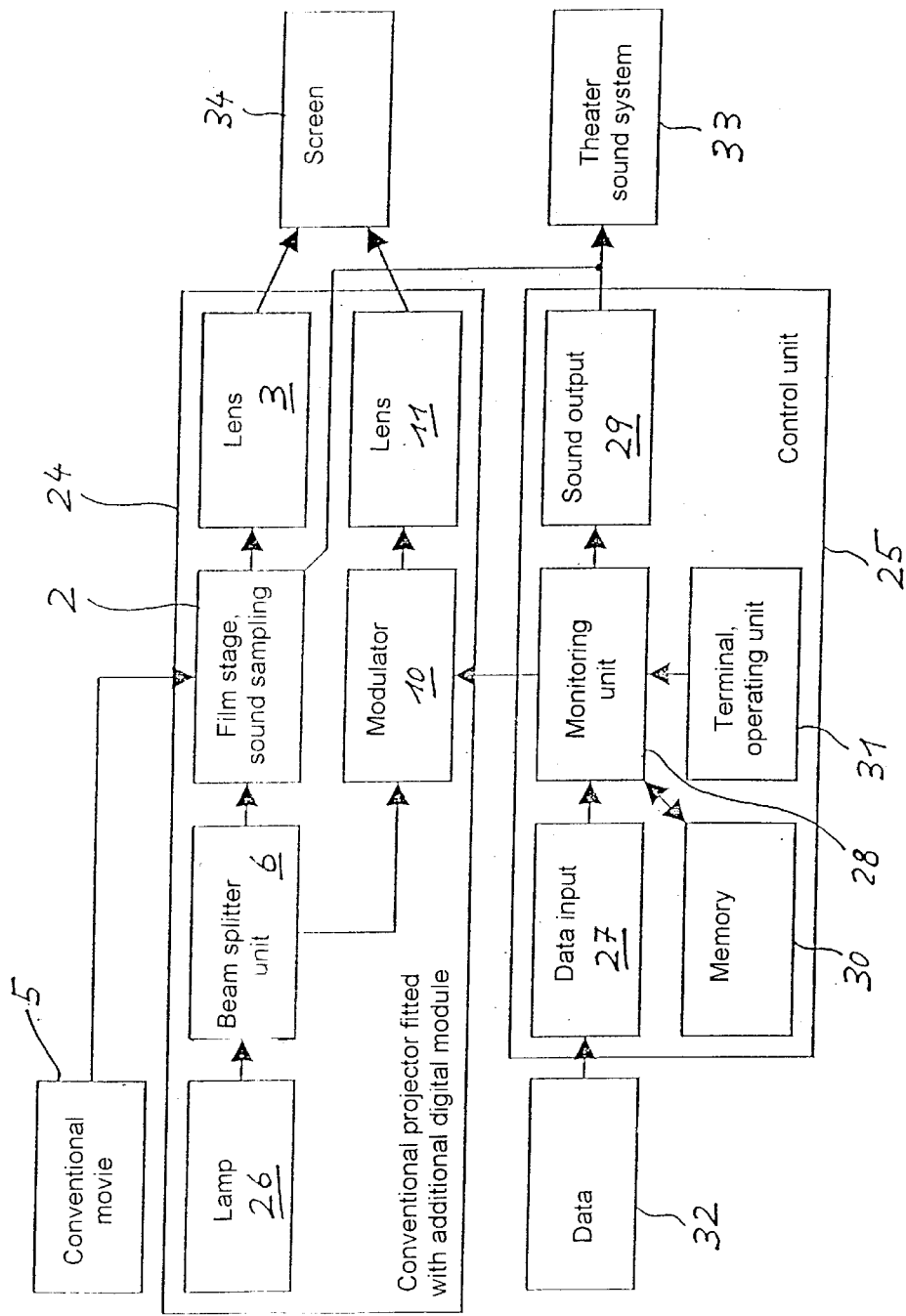
FIG. 3 shows a block diagram of the projection arrangement according to the invention.

FIG. 3 shows a block diagram of the projection arrangement according to the invention. As is evident from FIG. 3, the projection arrangement according to the invention comprises a projection unit 24 and a control unit 25. The projection unit 24 includes the light modulator 10, the projection optics 11, the lamp 26 arranged in the lamp housing 1, the beam splitter unit 6, the mechanical film stage 2 and the projection lens 3. The film 5 is fed to the mechanical film stage 2. The control unit 25 comprises a data input 27, a monitoring unit 28, a sound output 29, a memory 30, an operating unit 31, which includes an input unit, e.g. a keyboard, and a display device, e.g. a monitor, and further comprises an output interface (not shown), by which, e.g., the dimming of the auditorium lighting or the movement of a curtain away from the projection surface may be controlled. The control unit 25 may be provided as a separate unit, which may be set up separately from the projection unit 24, e.g. in a different room.

Various data links may be used to transmit the data from the control unit 25 to the projection unit 24. It is essential that the bandwidth be sufficient for data transmission. For example, the LVDS system (Low Voltage Differential Signaling System, of the National Semiconductor company) or the PanelLink system of the Silicon Image company, which allow transmission of large data volumes via a cable having only two wires, are advantageous.

The data 32 are fed to the control unit 25 via the data input 27. Said data input 27 may be, on the one hand, an interface to an external network, e.g. the internet. On the other hand, said data input 27 may also be realized by a drive receiving a storage medium, such as a DVD drive. The data entered via the data input 27 may either be written to the memory 30 by the monitoring unit 28 or used directly to control the light modulator 10 in the projection unit 24. The monitoring unit 28 may optionally filter out sound data from the input data and apply them to a theater sound system 33, synchronously with the image data, via the sound output 29.

The monitoring unit 28 may further use the image data either unmodified to control the light modulator 10, or may perform an adjustment of format or resolution or any other desired graphical transformation, said adjustment or transformation being realizable both by hardware and by software.

Further, the monitoring unit 28 allows to compensate distortions caused by the projection optics 11. These may be, for example, pin-cushion or barrel distortions. To this end, the image data for controlling the light modulator 10 are pre-distorted by the monitoring unit 28 in such a manner that said pre-distortion is compensated by the distortion of the projection optics 11, so that an image exhibiting as little distortion as possible is projected on the screen 34. If desired, the monitoring unit 28 also allows to perform color adjustments and color conversions.

The above-described data processing operations may be carried out either during projection or may be performed in advance, with the processed data then being stored in the memory 30.

Advantageously, the projection arrangement according to the invention may also comprise a camera (not shown), which is installed in the auditorium and records the image projected onto the screen 34 and transmits it to the control unit 25, which displays the transmitted image on the monitor of the operating unit 31. This allows to monitor that the movie performance is effected correctly and, if necessary, to take action immediately.

During projection, the image of the conventional motion picture is usually projected by the transillumination process. In addition, the additional-image generating module 7 generates and, at the same time, projects additional images, such as subtitles. The optionally required synchronisation between the projection of the movie and of the subtitles may be effected, for example, on the basis of the sound signals (optical sound, or control signals for digital sound included with the conventional movie. Thus, for example, the original sound may also be included completely or as excerpts in the subtitles file so as to allow measurement of the time difference that may occur under certain circumstances, by comparing these signals. A compensation of a measured difference may then be effected, for example, by omitting repetitions of individual images of the only slowly varying subtitles.

The additional-image generating module 7, the beam splitter unit 6 and the projection optics 11 may be provided as a projection module which can be coupled to and uncoupled from a conventional projector, such as that shown, for example, in FIG. 8. By being provided as a separate, portable projection module, this projection module may be coupled, for example, to the projector as required. It is also possible to acquire such a projection module for several projectors and to couple the projection module to the desired projector in each case.

In order to allow easy coupling of the projection module to said conventional projectors, there is preferably provided a support, which consists of a first coupling device provided on the respective projector and a second coupling device provided on the projection module. The first coupling device is disposed in a defined spatial relationship to the conventional projector. Preferably, it is attached to the foot of the lamp housing 1 of the projector and comprises a base having a self-centering three-point support, onto which the projection module may be placed. The self-centering three-point support comprises, for example, three conical sleeves, in which corresponding counterparts of the projection module engage when the projection module is rested thereon. Said conical sleeves may be individually adjusted in their position perpendicular to the plane of the supporting surface and may be adjusted together in the plane of the supporting surface. Thus, the support has an adjustment means, which is provided in the first coupling device remaining on the projector so that the projection module merely needs to be placed on the three-point support and is then immediately ready for operation.

Advantageously, the support may further comprise a data and current interface, which comprises a first plug element provided on the first coupling device and a second plug element provided on the second coupling device. Said plug elements are arranged such that, when the projection module is placed on the three-point support, a mechanical and electrical contact is established. To this end, one of said plug elements may be floatingly mounted, while the other of said plug elements has a fixed position.

When the support, as described above, is provided with a data interface, a corresponding supply line is provided for each conventional projector. This allows to provide just one single control unit 25 for all of the conventional projectors, so that the projection module and the control unit 25 are provided as separate units. On the one hand, this increases the transportability of the projection module. On the other hand, the control unit may be arranged at any desired location, so that there is no interference with the space in the projection booth in which the conventional projector is located.

Alternatively, the projection module may comprise the control unit 25. In this case, the projection module is an operable, transportable unit.

Figure 4:
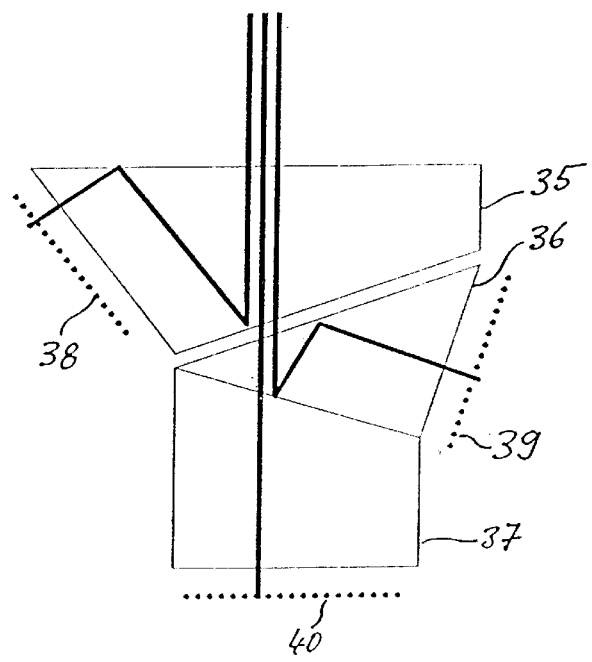
FIG. 4 shows a top view of the light modulator according to a further embodiment.
Figure 5:
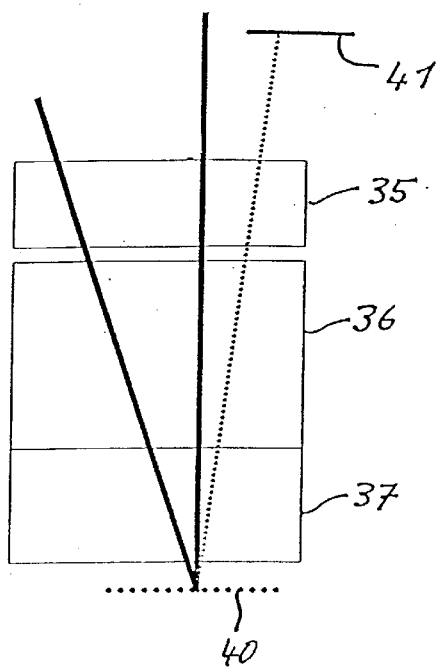
FIG. 5 shows a side view of the light modulator shown in FIG. 4.

FIGS. 4 and 5 show an alternative embodiment of the light modulator 10. In this embodiment, three prisms 35, 36 and 37 are arranged and provided such that, in the first prism 35, blue light from the light ray bundle deflected by the second deflecting mirror 9 is filtered out by reflection and directed to a tilting mirror matrix 38. Of the remaining light bundle, only the red light is filtered out by reflection in the second prism 36 and directed to a tilting mirror matrix 39. The remaining light, namely the green component, is directed to a tilting mirror matrix 40 by a third prism 37. The individual color components are suitably modulated and reflected back by the tilting mirror matrices 38, 39 and 40 according to the image data so that they are combined to form one common light ray bundle 20, which is projected onto the screen via the projection optics 11. FIG. 5 schematically shows that the individual mirrors may be tilted such that the imaging light is reflected back to the projection optics (solid line) or reflected back onto a diaphragm element 41 (dotted line). If the light is reflected onto the diaphragm element 41, the corresponding color pixel remains dark in the represented image. Instead of the tilting mirror matrices 38, 39 and 40, reflective LCD modules may be used as well.

In a further embodiment of the invention, the projection optics 11 of the additional-image generating module 7 are provided such that an intermediate image of the modulated image is generated in such a manner that the projection lens 3 may be used both for projection of the positive film and for projection using the additional-image generating module 7.

Figure 6:
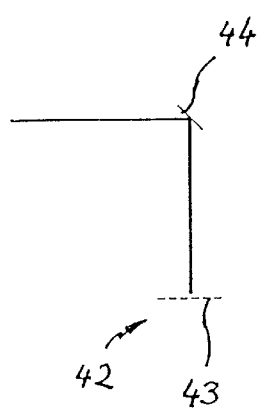
FIGS. 6 and 7 show schematic representations explaining an alternative embodiment of a light modulator.
Figure 7:
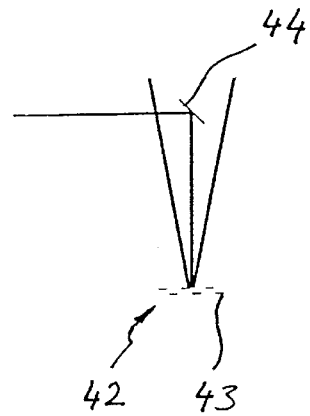

As the light modulator 10, a GLV module 42 may also be employed. FIGS. 6 and 7 schematically show the operation of such GLV module 42 (a switchable diffracting reflection grating), which may be employed, for example, in the light modulator shown in FIGS. 4 and 5 instead of the tilting mirror matrices 38, 39, 40 used therein. The GLV module 42 comprises several parallel reflecting strips 43 for each image pixel which are alternatingly fixed in their position and positioned moveable in height. In a first adjustable position, all of said strips 43 are situated in one plane, so that the light incident on the strips 43 via a deflecting element 44 is reflected back (FIG. 6). In a second position of the strips 43, shown in FIG. 7, every other strip 43 is offset in height relative to the other strips 43 so that the strips 43 form a reflecting diffraction grating. Due to said diffraction, a large part of the incident light is not reflected back again to the deflecting mirror 44. Thus, the intensity of the light reflected back by the deflecting mirror 44 is substantially lower than in the position of FIG. 6. This allows to realize brightness/darkness control of the image pixel. Thus, it is essential for this GLV module 42 that the angle of the light reflected by this module be modifiable as described above and that, depending on said angle, the reflected light be used either to generate a bright image pixel or be directed to a beam trap and thus darkened. It depends essentially on the construction of the light modulator whether the reflected light (FIG. 6) or the diffracted light (FIG. 7) is used for a brightened image pixel. The GLV module 42 may be present as a matrix arrangement so that the image pixels are arranged in lines and columns. Alternatively, the GLV module 42 may be realized as a linear arrangement of image points. In this case, scanning of the image line or image column is then required for imaging. This may be realized by known scanning devices arranged following the light modulator 10.

In a further embodiment, the first partially reflective mirror 8 may be provided such that the degree of splitting between the first and second partial beams varies over a beam cross-section of the light incident on the first partially reflective mirror 8. Thus, there may be, for example, a variation over the image height of the positive image to be projected, such that the positive image is illuminated as brightly as possible, while in the region of the subtitles mainly the additional-image generating module 7 is illuminated.

The first partially reflective mirror 8 shown in FIG. 1 may also be attached to a carriage (not shown), which is displaceable perpendicular to the light propagation direction of the light ray bundle 4 by means of a motor and a worm gear. This allows the first partially reflective mirror 8 to be moved into and out of the optical path. It is advantageous to provide mechanically self-locking locking devices, by which the first partially reflective mirror 8 is locked, respectively, in the extended or in the retracted state. Thus, the drive system of the carriage can be deenergized when the first partially reflective mirror 8 is in the retracted or extended state. To this end, the locking devices may further be provided with limit switches, which emit a signal when the first partially reflective mirror 8 is in the desired retracted or extended state. In a further embodiment, a deflecting element (e.g. a mirror) may be additionally provided, which is also attached to the carriage and arranged following the first partially reflective mirror 8 in the retracting or extending direction. In this case, the carriage can be displaced in three different positions. In the first position, the first partially reflective mirror 8 is in the optical path (simultaneous projection of the illuminated positive image and of the generated additional image), in the second position, only the deflecting element is in the optical path, in order to direct the light onto the light modulator (only the image generated by the light modulator is projected), and in the third position, neither the first partially reflective mirror 8 nor the deflecting element are in the optical path (only the illuminated positive image is projected).

What is claimed is:

1. A projection arrangement for projecting an image onto a projection screen, said arrangement comprising a light source, a film stage, arranged following the light source, for holding a positive image recorded on a carrier medium, projection optics for projecting an illuminated positive image, a control unit, a light modulator, which is controllable by said control unit in order to generate an additional image on the basis of predetermined image data, an optical device, arranged following said light modulator, for projecting said additional image onto the projection screen, and a beam splitter, arranged between the light source and the film stage, for splitting the light from the light source into a first partial beam directed to the film stage in order to illuminate the positive image and into a second partial beam which may be directed to the light modulator.

2. The projection arrangement as claimed in claim 1, wherein the light from the light source incident on the beam splitter comprises a beam cross-section and the beam splitter is formed such that the degree of splitting between the first and second partial beams varies over said beam cross-section of the light incident on the beam splitter.

3. The projection arrangement as claimed in claim 1, wherein the beam splitter comprises a partially reflective mirror, a beam splitter block, or a deflecting element which is arranged partially in a beam cross-section of the light.

4. The projection arrangement as claimed in claim 1, wherein the beam splitter is movable into and out of the optical path between the light source and the film stage.

5. The projection arrangement as claimed in claim 4, wherein a deflecting device is further provided which, when the beam splitter is moved out of the optical path between the light source and the film stage, is movable into said optical path so as to direct the light from the light source to the light modulator.

6. The projection arrangement as claimed in claim 1, wherein the beam splitter, the light modulator and the optical device are comprised in one attachable projection unit.

7. The projection arrangement as claimed in claim 1, wherein a splitting device is provided, which splits the light from the light source into different color components, and the light modulator comprises several light modulating units, each of which modulates one of said color components.

8. The projection arrangement as claimed in claim 7, wherein a combining device is provided which combines the light emitted by the light modulating units to form one single light bundle and guides said light bundle to the optical device.

9. The projection arrangement as claimed in claim 1, wherein the light modulator comprises an LCD module, a tilting mirror or a GLV module.

10. The projection arrangement as claimed in claim 1, wherein the projection optics and the optical device are realized as one single projection unit.

11. The projection arrangement as claimed in claim 1, wherein at least one of a memory for storing data, an input interface for receiving data and an output interface are provided.

12. The projection arrangement as claimed in claim 11, wherein an output interface and a sound unit are provided, which sound unit can extract sound data from said data and feed them into a sound system via the output interface.

13. The projection arrangement as claimed in claim 1, wherein a display device and an image recording device are provided, said image recording device being able to record the image projected onto the projection screen and to represent it on the display device.

14. The projection arrangement as claimed in claim 1, wherein the projection arrangement is adapted to project moving images.

15. A projection unit for coupling to a projector, which projector comprises a light source, a film stage, arranged following said light source, for holding a positive image recorded a carrier medium, as well as projection optics for projecting an illuminated positive image onto a projection screen, said projection unit comprising a control unit, a light modulator controllable by said control unit in order to generate an additional image on the basis of predetermined image data, an optical device, arranged following the light modulator, for projecting the additional image onto the projection screen, and a beam splitter, wherein the beam splitter, when the projection unit is coupled to the projector, is arranged between the light source and the film stage and splits the light from the light source into a first partial beam directed to the film stage in order to illuminate the positive image and into a second partial beam which may be directed to the light modulator.

* * * * *